June 18, 1963   S. A. MURDOCK ET AL   3,094,504
GRAFT COPOLYMERS OF CERTAIN MONOMERIC SULFONIC ACID
COMPOUNDS ON N-VINYL-3-MORPHOLINONE POLYMER
SUBSTRATES AND IMPROVED ACRYLONITRILE
POLYMER COMPOSITIONS
OBTAINABLE THEREWITH
Filed Sept. 11, 1959

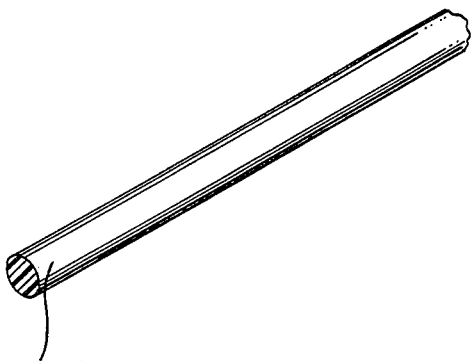

Filamentous article comprised of an acrylonitrile polymer having a graft copolymer of a monomeric organic sulfonic acid graft copolymerized upon an N-vinyl-3-morpholinone polymer substrate incorporated therein.

INVENTORS.
Stanley A. Murdock
Teddy G. Traylor
BY
ATTORNEY

United States Patent Office 3,094,504
Patented June 18, 1963

3,094,504
GRAFT COPOLYMERS OF CERTAIN MONOMERIC SULFONIC ACID COMPOUNDS ON N-VINYL-3-MORPHOLINONE POLYMER SUBSTRATES AND IMPROVED ACRYLONITRILE POLYMER COMPOSITIONS OBTAINABLE THEREWITH
Stanley A. Murdock, Rancho Cordova, Calif., and Teddy G. Traylor, Cambridge, Mass., assignors to The Dow Chemical Company, Midland, Mich., a corporation of Delaware
Filed Sept. 11, 1959, Ser. No. 839,501
18 Claims. (Cl. 260—45.5)

The present invention resides in the general field of organic chemistry and contributes specifically to the polymer art, especially with respect to graft copolymer compositions and fiber-forming polymer blends obtainable therewith. It is particularly concerned with graft copolymers of certain monomeric sulfonic acid compounds on preformed substrate N-vinyl-3-morpholinone polymers (hereinafter referred to as VM polymers) that have especial utility as dye-receptive, antistatic and stabilizing additaments for acrylonitrile polymer compositions which, advantageously, may be of the fiber-forming variety. The invention is also concerned with the compositions that may be obtained by blending the graft copolymers with acrylonitrile polymers, as well as with shaped articles which have been fabricated from such compositions and which as a consequence, have significantly enhanced properties and characteristics as regards improvements in and relating to enhanced dye-receptivity, minimized inherent propensity to accumulate electrostatic charges, natural stability to various deteriorating influences, including stability against becoming deleteriously influenced and degraded upon exposure to heat at elevated temperatures and to light.

Within the scope and purview of the invention, there is comprehended (1) the novel and utile graft copolymers of the indicated variety; (2) the advantageous polymer compositions, particularly fiber-forming compositions, obtained by blending the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of certain monomeric sulfonic acid compounds on VM polymers that are especially well suited for being incorporated in acrylonitrile polymer compositions, particularly compositions of polyacrylonitrile, to serve in the indicated treble capacity of dye-assisting adjuvants, antistatic agents and stabilizing ingredients. It is also a principal aim and chief concern of the invention to provide and make available acrylonitrile polymer compositions and shaped articles therefrom that contain the above-indicated and hereinafter more fully delineated type of graft copolymeric additaments, which compositions have, as intrinsic distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light, as well as to certain chemical conditions, such as alkaline environments.

The graft copolymers of the present invention which have the indicated capacity and utility as additaments for acrylonitrile polymer compositions are comprised of (b) a preformed VM polymer trunk or base substrate (as hereinafter more precisely delineated) on which there is graft copolymerized (a) a monomeric, alkenyl group-containing, organic sulfonic acid or derivative compound thereof that is selected from the group of such compounds (including mixtures thereof) consisting of those represented by the formulae:

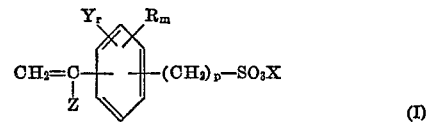

(aromatic organic sulfonic acid compounds)

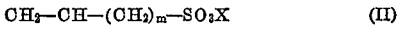

(alkenyl organic sulfonic acid compounds)

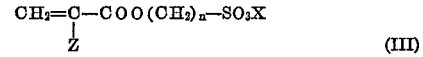

(sulfoalkylacrylate organic sulfonic acid compounds)

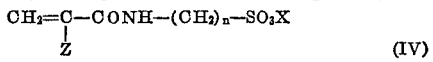

(acryloyl taurine homolog compounds)

and

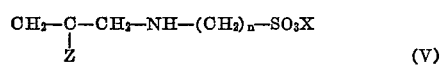

(allyl taurine homolog compounds)

all wherein X is hydrogen, a saturated aliphatic hydrocarbon radical containing from 1 to 4 carbon atoms or an alkali metal ion (including sodium, potassium and lithium); Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1 and $r$ is 1 to 4.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 percent by weight of acrylonitrile which, preferably, is of the fiber-forming variety and, most advantageously, is polyacrylonitrile but which, as indicated, may suitably be a fiber-forming copolymer and (B) a minor proportion of the above-indicated variety of beneficial graft copolymeric additament that functions in the described manner.

The methods of the invention by which the herein contemplated advantageous compositions may be made involve preparation of the graft copolymer, as well as incorporation of a minor proportion of the graft copolymer product as a beneficial additament in and with the acrylonitrile polymer base by any of several beneficial techniques, hereinafter more thoroughly defined, adapted to suitably accomplish the desired result.

Without being limited to or by the specific embodiments and modes of operation set forth, the invention is exemplified in and by the following didactic illustrations wherein, unless otherwise indicated, all parts and percentages are to be taken on a weight basis.

ILLUSTRATION "A"

Into a 5 liter reactor that is equipped with an efficient agitator, a nitrogen sparger, and a total reflux condenser, there is charged about 370 grams of 47.36 percent aqueous solution of poly-N-vinyl-3-morpholinone (PVM). The relative viscosity of the PVM in water at 25° C. is about 1.85 at a concentration of 1 gram of the water-soluble polymer in 100 ml. of solution. About 800 milliliters of water is then added to the PVM solution. The resulting aqueous solution is brought to the boil and nitrogen is then sparged into the reactor. The nitrogen sparging is conducted throughout the ensuing reaction.

Over a three hour period, about 180 grams of a sodium styrene sulfonate monomer dissolved in water to a total volume of 2,000 ml. and 0.3 gram of hydrogen peroxide dissolved in water to a total volume of 500 ml. are continuously pumped into the reactor. The sodium styrene sulfonate monomer is about 41.6 percent active, as determined by bromination. The balance of the styrene sulfonate is substantially all sodium bromide with a small quantity of sodium sulfate and a trace of polymer in the monomeric material.

After the entire quantities of the monomer and catalyst solutions are charged to the reactor, the heating is continued and the temperature of the reaction mass is maintained at about 98° C. for an additional one hour period. The reaction is then terminated and the graft copolymer-containing solution removed from the reactor. The polymer product is a clear, light brown solution that has a polymer content of about 7.8 percent. Upon analysis, about 95 percent of the sodium styrene sulfonate monomer is found converted to a graft copolymer product with the PVM.

Polyacrylonitrile fibers containing about 10 percent of the above graft copolymer product, based on fiber weight (OWF), are prepared by impregnating filamentary structures that are in aquagel condition (after having been salt-spun and wet-stretched) in and with a dissolved aqueous solution of the graft copolymer that contains about 3 percent (graft) copolymer solids. The polyacrylonitrile aquagel fiber is initially obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 42 percent of dissolved zinc chloride to form a multiple filament tow. After being spun, the tow bundle of coagulated polyacrylonitrile aquagel fiber is washed substantially free from salt upon being withdrawn from the coagulating bath and then wet-stretched for orientation to a total stretched length that is about thirteen times (13×) its original extruded length. The aquagel fiber is then passed through the mentioned aqueous impregnating bath of the dissolved graft copolymer additive so as to become impregnated therewith to the indicated extent. The impregnating bath is maintained at the boil and is simultaneously employed as a hot stretching medium for the aquagel fiber.

Following the impregnation, the aquagel fiber is irreversibly dried at 150° C. to destroy the water-hydrated structure and convert it to a finished fiber form. It is then heat set for five minutes at 150° C. The finally obtained 3 denier fiber product has a tenacity of about 4.0 grams per denier, an elongation of about 29 percent, and a wet yield strength of about 0.9 gram per denier. The graft copolymer-containing acrylonitrile polymer fiber product is found to have excellent natural stability to heat and light as well as against becoming degraded under the influence of aqueous alkaline media at pH levels as high as 10. It is found to be nearly free of propensity to accumulate charges of static electricity upon handling, being about commensurate at about 60 percent relative humidity with viscose rayon fibers in this regard. As is widely appreciated, viscose rayon is not considered to be afflicted to a troublesome degree with problems due to static.

In addition, the graft copolymer-containing sample has good color and hand and is dyeable with all classes of dyestuffs as applied under normal dyeing conditions.

The fiber product dyes well to deep and level shades of coloration with Calcodur Pink 2BL, a direct type of dyestuff (Colour Index Direct Red 75) and Sevron Brilliant Red 4G, a basic dye formerly known as Basic Red 4G (Colour Index Basic Red 14).

The dyeing with Calcodur Pink 2BL is performed at the 4 percent level according to conventional procedure in which the fiber sample is maintained for about one hour at the boil in the dye bath which contains the dyestuff in an amount equal to about 4 percent OWF. The dyebath also contains sodium sulfate in an amount equal to about 15 percent OWF and has a bath-to-fiber weight ratio of about 30:1, respectively. After being dyed, the fiber is rinsed thoroughly with water and dried for about 20 minutes at 80° C. The dye-receptivity of the Calcodur Pink 2BL-dyed fiber is then evaluated spectrophotometrically by measuring the amount of monochromatic light having a wave length of about 520 millimicrons from a standard source that is reflected from the dyed sample. A numerical value on an arbitrarily designated scale from zero to one hundred is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product is about 28.

The antistatic properties of the graft copolymer-containing fiber are then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of electricity. Thus, a measure of the electrical conductance of a fiber is a good indication of its ability to dissipate static electricity. The conductivities of the various fiber samples tested are found by determining their electrical resistances. Resistance, of course, is the reciprocal quantity of conductivity. In order to permit various fiber samples to be compared on a common basis, the conductivities of the samples tested are actually measured as volume resistivities according to the following formula:

Volume resistivity $$= \frac{(\text{Resistance})(\text{Cross-sectional area})}{\text{Path length between electrodes to which sample being tested is attached}}$$

The units of volume resistivity are ohm-cm.²/cm.

Prior to being tested, the graft copolymer-containing polyacrylonitrile fiber prepared in the indicated manner is vat dyed in the conventional manner with Cibanone Green BF Dbl. Paste (Colour Index Vat Green No. 1). A portion of the vat dyed sample is then subjected to fifteen (15) consecutive No. 3-A accelerated wash tests in accordance with the American Association of Textile Chemists and Colorists (AATCC) Manual. The actual resistivities of the merely vat dyed sample as well as that of the sample that is both vat dyed and wash tested are then determined (after the samples being tested are conditioned for seventy-two hours at the particular temperature and relative humidity conditions involved in each of the tests) by tautly connecting a web-like sample of the yarn between two electrodes, each of which are 9 centimeters long spaced parallel 13 centimeters apart, and across which there is applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) are also tested in the indicated manner along with the graft copolymer-containing fiber in accordance with the present invention.

The results are set forth in the following tabulation which indicates the volume resistivities obtained at various relative humidities (RH) at 23° C. of each of the samples tested.

Table 1

[Volume Resistivities of Various Fiber Samples Compared to Polyacrylonitrile Fibers Impregnated With Graft Copolymer of Sodium Styrene Sulfonate on PVM]

| Sample | Volume Resistivity, ohm-cm.²/cm. | |
| --- | --- | --- |
| | 47 percent RH | 66 percent RH |
| Vat dyed graft copolymer-containing fiber | $5.6 \times 10^{10}$ | $9.2 \times 10^{6}$ |
| Vat dyed and 15X wash tested graft copolymer-containing fiber | $3.2 \times 10^{10}$ | $9.9 \times 10^{6}$ |
| Cotton | $2.7 \times 10^{8}$ | $5.4 \times 10^{6}$ |
| Wool | $2. \times 10^{11}$ | $3.3 \times 10^{9}$ |
| Unmodified polyacrylonitrile fiber | $2.7 \times 10^{13}$ | $1.2 \times 10^{12}$ |

As is apparent in the foregoing, the graft copolymer-containing sample, even after being severely washed, has electrical conductance properties much superior to ordinary polyacrylonitrile and only slightly poorer than cotton. At the same time, the physical properties of the copolymer-containing fiber are excellent, being about equal to those of the unmodified polyacrylonitrile fiber.

In contrast with the foregoing, a polyacrylonitrile fiber prepared in the above-indicated manner so as to be impregnated while in the aquagel form with a mere physical mixture of PVM and the homopolymer of sodium styrene sulfonate produces a fiber which has a very harsh feeling and an undesirable hand. When this fiber sample which contains the mere physical mixture of PVM and the sodium styrene sulfonate homopolymer is subjected to severe washing and vat dyed in general accordance with the foregoing procedure, its volume resistivity characteristics and static properties are about the same upon testing as those indicated in the above table for unmodified polyacrylonitrile.

ILLUSTRATION "B"

Using the same apparatus as described in Illustration "A," about 1000 grams of a 30 percent aqueous solution of the same PVM is charged to the reactor. The PVM solution is then brought to the boil, at which point nitrogen sparging is commenced and continued throughout the entire run. About 400 grams of 50 percent active sodium styrene sulfonate monomer, dissolved in water to a total volume of about 2670 ml., and 0.1 gram of hydrogen peroxide, dissolved in water to a total volume of 272 ml., are continuously metered into the hot PVM solution in the reactor over a 3 hour period. After the addition of the aqueous solutions of monomer and catalyst are completed, the charge in the reactor is held at the boil for about 2 hours. At the termination of the polymerization reaction which occurs, the graft copolymer-containing reaction mass is drained and a clear, light brown polymer solution is obtained. The conversion of monomer to graft polymer is found to be about 56 percent. The product solution is found to contain about 14 percent of dissolved graft copolymer solids, in which the ratio of PVM to sodium styrene sulfonate graft copolymerized thereon is found to be on the order of about 72:28, respectively.

A solution of about 3 percent of the graft copolymer is prepared to impregnate a polyacrylonitrile aquagel fiber in a manner similar to that set forth in Illustration "A." The impregnation of the copolymeric additament is accomplished during the stretch drawing of the aquagel in the second stage of the physical extension operation by means of which the fiber is oriented and while it is immersed in the hot graft copolymer solution. The total stretching of the aquagel is performed in a four stage operation. In the first stage, the aquagel is cold stretched with a stretch ratio of about 1.56:1. The initial cold stretching is followed by three hot stretch stages (the first of which is the above-mentioned stage in which the impregnation is accomplished) wherein the sequential stretches imposed are on the order of 3.89 times; 1.89 times; and 1.20 times their initial length prior to stretching, respectively. After being impregnated with the copolymer, the aquagel fiber is dried at about 150° C. It is found to contain about 3.5 percent of the polymeric additament intimately incorporated therein.

The graft copolymer-containing fiber has good color, excellent hand and is dyeable with all classes of dyes at normal dyeing conditions. Its stability to light, heat and alkaline media having a pH as high as 10 are excellent. Its physical properties are about as follows:

Denier _____ 3.
Tenacity _____ 2.5 grams per denier.
Elongation _____ 29 percent.
Dry yield strength _____ 0.8 gram per denier.
Wet yield strength _____ 0.55 gram per denier.

The volume resistivities under various conditions of relative humidity at 23° C. of the graft copolymer-containing fiber product are determined in the manner set forth in Illustration "A" after a portion of the fiber has been vat dyed with Cibanone Green BF, Dbl. Paste and a portion of the vat dyed fiber is subjected to five (5) No. 3–A accelerated wash tests. The values found for the vat dyed fiber are about $3.6 \times 10^{10}$ ohm-cm.²/cm. at 47 percent RH and about $8.4 \times 10^{7}$ ohm-cm.²/cm. at 66 percent RH. The values for the vat dyed and wash tested sample are about $1.4 \times 10^{10}$ ohm-cm.²/cm. at 47 percent RH and about $1.2 \times 10^{8}$ ohm-cm.²/cm. at 66 percent RH. The superiority in antistatic properties of the graft copolymer-containing fiber, even after severe scouring, dyeing and washing treatments, is evidenced by comparison of the foregoing volume resistivity values with those obtained under the same conditions for cotton wool and unmodified polyacrylonitrile fibers, are set forth in the preceding Table 1.

ILLUSTRATION "C"

The general procedure of the foregoing examples is employed to prepare a graft copolymer from the following charge which is polymerized for about 16 hours at a temperature of 50° C.:

| | Grams |
| --- | --- |
| Sodium vinyl benzyl sulfonate | 1.5 |
| PVM (rel. vis. at 25° C.—1.85) | 1.5 |
| Water | 12.0 |
| Potassium persulfate | 0.03 |

The aqueous solution of the graft copolymer that is obtained as a product is clear and only slightly colored. Conversion of the monomer to graft copolymer is found to be about 87 percent. The graft copolymer product contains about 54 percent PVM and 46 percent graft copolymerized sodium vinyl benzyl sulfonate. It is found to be an excellent dye additive and permanent antistatic agent for acrylonitrile polymer fibers when it is incorporated in them in the manner set forth in the preceding illustrations. The graft copolymer-containing fibers have good dye-receptivity, excellent static characteristics, satisfactory stability and suitable physical properties.

ILLUSTRATION "D"

Following the procedure of Illustration "C," graft copolymer products are obtained from each of the following charges:

BATCH D–1

Acryloyl taurine, sodium salt _____ grams__ 1.1
PVM (Fikentscher K-value of 30) _____ do____ 2.6
Water _____ ml__ 15.2
Potassium persulfate _____ grams__ 0.02
pH of charge _____ 7.5
Conversion of monomer to graft copolymer
_____ percent__ 88

The product is a lightly colored solution. It contains a graft copolymer of about 70 percent PVM upon which there is graft copolymerized about 30 percent of the taurine. The nomenclature taurine, incidentally, is commonly employed to designate 2-aminoethane sulfonic acid.

BATCH D-2

| | |
|---|---|
| 2-sulfoethyl acrylate, sodium salt _____grams__ | 1.1 |
| PVM (Fikentscher K-value of 30)_____do____ | 2.6 |
| Water _____ml__ | 15.2 |
| Potassium persulfate _____grams__ | 0.02 |
| pH of charge _____ | 8.5 |
| Conversion of monomer to graft copolymer percent__ | 90 |

The dissolved graft copolymer solution that is obtained as a product has a slight yellow coloration. The composition is about 75 percent PVM and 25 percent graft copolymerized sodium 2-sulfoethyl acrylate.

BATCH D-3

| | |
|---|---|
| 2-sulfoethyl methacrylate, sodium salt____grams__ | 1.1 |
| PVM (Fikentscher K-value of 30)_____do____ | 2.6 |
| Water _____ml__ | 15.2 |
| Potassium persulfate _____grams__ | 0.02 |
| pH of charge _____ | 8.5 |
| Conversion of monomer to graft copolymer percent__ | 90.5 |

The product graft copolymer solution has a slight yellow color. The composition of the graft copolymer is about 72 percent PVM and 28 percent graft copolymerized sodium 2-sulfoethyl methacrylate.

BATCH D-4

| | |
|---|---|
| Sodium styrene sulfonate _____grams__ | 6.0 |
| PVM _____do____ | 6.0 |
| Water _____do____ | 48.0 |
| Potassium persulfate _____do____ | 0.12 |
| pH of charge _____ | 2.0 |

Conversion is about 90 percent with the product obtained being a clear, colorless solution.

Excellent results commensurate with those set forth in the first three illustrations, are obtained when each of the above graft copolymer products is incorporated in polyacrylonitrile fibers following the procedure set forth in the first illustration. Excellent results are also obtained when the foregoing general procedure is repeated to prepare graft copolymers upon PVM of allyl taurine; sodium salt, graft copolymers upon PVM of allyl propene sulfonic acid; and graft copolymers upon PVM of the sodium salt of ethylene sulfonic acid with each of the graft copolymer products having compositions equivalent to those described.

Excellent results may also be obtained when the foregoing is repeated to prepare graft copolymer additives from other N-vinyl-3-morpholinone polymer substrates, such as copolymers of VM with N-vinyl-2-pyrrolidone; N-vinylcaprolactam; N-vinyl-5-methyl-2-pyrrolidone; N-vinylpiperidone; and other vinyl lactam monomers; N-vinyl-2-oxazolidinone; N-vinyl-5-methyl-2-oxazolidinone; N-vinyl-5-ethyl-2-oxazolidinone; N-vinyl-2-oxazindinone; and other N-vinyl cyclic carbamate monomers; and so forth, within the compositional ranges detailed below.

Results similar to those set forth in the foregoing can likewise be obtained when the graft copolymer additaments are incorporated in polyacrylonitrile and other acrylonitrile polymer fibers to provide articles in accordance with the present invention by blending or mixing together the graft copolymer and the fiber-forming acrylonitrile polymer in a spinning composition or dope prior to its extrusion into filamentary products by either wet spinning or dry spinning techniques. In such instances, incidentally, it may be desirable, in order to secure optimum benefit in the practice of the invention, to employ relatively larger quantities of the graft copolymeric additament than when surface impregnation is performed so that the presence of effective quantities of the additament at or near the peripheral portion of the article is assured.

Besides those specifically illustrated herein, other organic sulfonic acid compounds may also be utilized for the preparation of the graft copolymer products of the present invention such, by way of illustration, as those which are set forth in the disclosure of United States Letters Patent Number 2,527,300. In addition to the copolymers specifically described in the foregoing examples, other copolymeric additaments that may advantageously be employed in the practice of the present invention include graft copolymers on the indicated preformed VM polymer substrates of such organic sulfonic acid compounds as 2-propene sulfonic acid; sodium para-vinylbenzene sulfonate; 2- and/or 3-sulfopropyl acrylate; α-sulfoacrylic acid; sodium vinyl toluene sulfonate; potassium ortho-chlorostyrene sulfonate; 2-hydroxy-3-sulfopropyl acrylate, sodium salt; sodium 3-alloxyl-2-hydroxypropane sulfonate; 4-sulfophenyl acrylate, sodium salt; N-allyl imino di-(2-ethane sulfonic acid); and the like.

Still other organic sulfonic acid compounds that may be employed are as set forth in the following representative, but by no means exhaustive, listing wherein they are grouped according to the above designated types.

*Aromatic Alkenyl-Containing Sulfonic Acid Compounds (Formula I)*

Para-styrene sulfonic acid
Ortho-styrene sulfonic acid
Para-isopropenyl benzene sulfonic acid
Para-vinylbenzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinylbenzyl sulfonate
Ortho-vinyl benzyl sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-ixopropenyl benzene sulfonic acid
3-vinyl toluene 6-sulfonic acid, sodium salt
2-ethyl-4-vinyl-benzene sulfonic acid
2,3-dichloro-4-vinyl benzene sulfonic acid
2,3,5-tribromo-4-vinyl benzene sulfonic acid
2-chloro-3-vinyl toluene-6-sulfonic acid
2,3-diethyl-4-vinyl-benzyl sulfonate, sodium salt

*Alkenyl Sulfonic Acid Compounds (Formula II)*

Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
2-butylene 4-sulfonic acid, n-butyl ester
1-butylene 3-sulfonic acid
Tertiary butylene sulfonic acid

*Sulfoalkylacrylate Compounds (Formula III)*

Sulfomethylacrylate
2-sulfoethylacrylate
Sulfomethylmethacrylate, sodium salt
2-sulfoethylmethacrylate, methyl ester
2-sulfoethylmethacrylate, potassium salt

*Acryloyl Taurine and Homolog Compounds*
*(Formula IV)*

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminomethane sulfonic acid
N-methacryloyl-aminomethane sulfonic acid, sodium salt
Methyl N-methacryloyl-aminomethane sulfonate

*Allyl Taurine and Homolog Compounds (Formula V)*

Allyl taurine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-allyl-aminomethane sulfonate
Lithium N-methallyl-aminomethane sulfonate
n-Butyl N-allyl-aminomethane sulfonate The N-vinyl-3-morpholinone polymers that are utilized as preformed substrates in the preparation of the graft copolymeric additaments of the present invention have, as an essential constituent of their polymeric structure, characterizing proportions of the recurring group

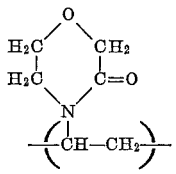

As has been indicated, copolymers of N-vinyl-3-morpholinone may also be employed. Thus, copolymers of N-vinyl-3-morpholinone with various homologous alkyl ring-substituted N-vinyl-3-morpholinone monomers maye be utilized, such as copolymers of N-vinyl-3-morpholinone with N-vinyl-5-methyl-3-morpholinone, N-vinyl-5-ethyl-3-morpholinone, and the like Copolymers of N-vinyl-3-morpholinone with various N-vinyl lactam polymers, such as N-vinyl pyrrolidone, N-vinyl-piperidone, N-vinyl caprolatam, N-vinyl-5-methyl-2-pyrrolidone and the like may also be prepared. Advantages are also achieved with copolymers of N-vinyl-3-morpholinone and various of the N-vinyl-2-oxazolidinone monomers, such as N-vinyl-2-oxazolidinone, N-vinyl-5-methyl-2-oxazolidinone, N-vinyl-5-ethyl-2-oxazolidinone, N-vinyl-2-oxazinidinone, and so forth. These N-vinyl-3-morpholinone polymers and their preparation are discussed in U.S. Patents 2,952,668, filed April 16, 1958; 2,946,772 filed February 27, 1958; and 2,948,708 filed April 3, 1958; and in the co-pending application for U.S. Patent having Serial Number 692,587, now U.S. 2,987,509 filed October 28, 1957, and entitled "N-Vinyl-3-Morpholinone Compounds."

Advantageously, the N-vinyl-3-morpholinone polymer that is used in the manufacture of the graft copolymer product has a Fikentscher K-value between about 5–10 and about 100 and, more advantageously, between about 20–30 and 60.

Beneficially, as mentioned, the N-vinyl-3-morpholinone polymer that is utilized is a water-soluble material. In cases where N-vinyl-3-morpholinone copolymers are employed that tend to water-insolubility with decreasing proportions of N-vinyl-3-morpholinone in the copolymer molecule (as is the case with copolymers of N-vinyl-3-morpholinone and N-vinyl-5-methyl-2-oxazolidinone), it is generally most desirable for the copolymer to contain at least about 40 weight percent of the N-vinyl-3-morpholinone polymerized therein. This avoids working with a product that may have a cloud (or precipitation) point in water or other aqueous solution beneath the boil.

The graft copolymer products of the present invention may generally be prepared by methods of polymerization, such as those which have been demonstrated in the foregoing exemplifying illustrations, that employ such polymerization catalysts as persulfates, organic and inorganic peroxide and azo type materials in quantities that are conventional for such uses. The graft copolymers may oftentimes be prepared by polymerizing the monomeric constituent onto the performed polymer substrate under the influence of high energy irradiation such as by means of X-rays and the like, or simply by heating or evaporating the monomeric-containing polymerization mixture. The graft copolymers may be prepared in both aqueous and organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 5 to 60 hours.

The compositions of the graft copolymer can vary within rather wide limits. The content of the monomeric constituent that is graft copolymerized on the preformed polymer substrate may advantageously be between about 10 and about 80 weight percent of the resulting graft copolymer product and, more advantageously, between about 30 and 60 weight percent. In many cases, especially to secure optimum dye-receptivity, nearly equivalent or about commensurate or equal weight proportions of the performed polymer substrate and the monomeric constituent graft copolymerized thereto may be employed with benefit in the preparation of the graft copolymeric additaments.

The polymerization system that is employed for the preparation of the graft copolymers of the present invention may consist of as much as 50 percent by weight of the mixture of monomers and preformed polymer substrate to be polymerized in the aqueous or other medium. The amount of polymerizable constituents that are provided in the graft copolymerization system may be influenced somewhat by the manner in which it is intended to incorporate the product in the synthetic polymer compositions in order to provide the graft copolymer-containing acrylonitrile polymer compositions of the invention.

If, for example, it is intended to incorporate the graft copolymer products by blending into a fiber-forming composition prior to its fabrication into shaped articles, the polymerization system may, if desired, contain about equal proportions by weight of the charged polymerizing constituents and the polymerization medium which, preferably, is miscible with and tolerable in the spinning solution solvent intended to be used. In such cases, the graft copolymer product may ordinarily be readily isolated from unreacted monomer and directly incorporated in the fiber-forming composition. If the incorporation of the graft copolymer in a fiber-forming composition is to be achieved by impregnation therewith of an already-formed shaped article of the composition, it may be desirable to effect the graft copolymerization so as to directly form a suitable applicating solution (or suspension in the cases where a non-solvent polymerization vehicle is employed) of the graft copolymer product. For such purposes, the polymerization system may be prepared to contain as little as 2 or 10 percent by weight of the polymerizing monomeric and polymeric ingredients. Such a method for preparing the graft copolymers may be especially appropriate when they are intended, in the practice of the present invention, to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the graft copolymeric additament may be impregnated into the fiber from aqueous solution while the fiber is in a swollen or gel condition, as a polyacrylonitrile fiber in an aquagel condition, in order to obtain the desired copolymer-containing product.

If desired, the graft copolymer-containing acrylonitrile polymer compositions may comprise as much as 20 or more weight percent of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity, antistatic properties and stability may frequently be obtained when a quantity of the copolymeric additament that is as small as 2 (and even as low as 1 or less) weight percent is employed. Advantageously, an amount between about 6 and 12 weight percent of the copolymeric additament may thus be utilized in the composition. Greater advantages may often accrue when the amount of the copolymeric additament that is incorporated in the composition is in the neighborhood of 5–10 weight percent, based on the weight of the composition.

As has been indicated, the graft copolymeric additaments may be incorporated in or physically together with the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially (particularly should insoluble or partially insoluble products be involved), the polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming systems by sequentially dispersing the polymers in any desired order in a suitable medium, as by incorporating the copolymeric additament in a prepared acrylonitrile polymer spinning solution, dope or the like.

As is evident from the illustrations heretofore included, a highly advantageous technique for providing the compositions, particularly when acrylonitrile polymer fiber products are involved, is to apply or impregnate the copolymeric additament from an aqueous dispersion thereof to a shaped acrylonitrile polymer article that is in an aquagel condition in a known manner. Thus an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a composition and an article in accordance with the invention. In addition, as has been demonstrated in the examples, in situ polymerization techniques may also be relied upon to provide the copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funcicular structures, ribbons, tapes, films, foils, sheets and the like which may be manufactured from synthetic polymeric materials.

It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known aqueous saline solvents for the polymer. Acrylonitrile polymer fiber products that are spun from saline fiber-forming systems may, by way of further illustration, be coagulated in more dilute aqueous saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol, basic and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1 also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing acrylonitrile polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1), and Rhodamine B Extra S (Colour Index Vat Blue 35); such vat dyestuffs as Midland Vat Blue R Powder (Colour Index Vat Blue 35), Sulfanthrene Brown G paste (Colour Index Vat Brown 5), Sulfanthrene Blue 2B Dbl. Paste (Colour Index Vat Blue 5), and Sulfanthrene Red 3B Paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyed products exhibit good wash-fastness and retain the dye-assisting copolymeric additament in a substantially permanent manner, despite repeated exposure and subjection to washing, laundering and dry cleaning treatments.

What is claimed is:

1. Graft copolymer of between about 10 and about 80 weight percent of (a) an alkenyl group-containing organic sulfonic acid compound selected from the group consisting of those represented by the formulae:

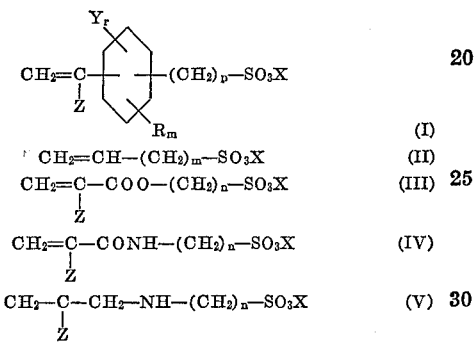

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1, and $r$ is an integer from 1 to 4; and (b) about 90 to about 20 weight percent of a polymerized monoethylenically unsaturated monomeric material containing at least about 10 weight percent of polymerized N-vinyl-3-morpholinone and up to 90 weight percent of another polymerized N-vinyl heterocyclic compound which compound is copolymerizable with N-vinyl-3-morpholinone.

2. The graft copolymer of claim 1, containing in the polymer molecule, in polymerized form, between about 30 and about 60 weight percent of said organic sulfonic acid compound as graft copolymerized substituents on said N-vinyl-3-morpholinone polymer.

3. The graft copolymer of claim 1, wherein said polymer is poly-N-vinyl-3-morpholinone.

4. Method for the preparation of a graft copolymer which comprises polymerizing between about 10 and about 80 weight percent, based on resulting graft copolymer weight, of an alkenyl group-containing organic sulfonic acid compound selected from the group consisting of those having the formulae:

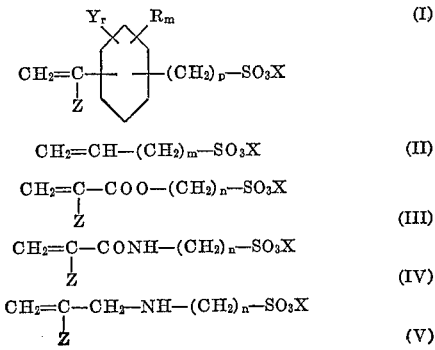

all wherein X is selected from the group consisting of hydrogen saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with between about 90 and about 20 weight percent of a polymerized monoethylenically unsaturated monomeric material containing at least about 10 weight percent of polymerized N-vinyl-3-morpholinone and up to 90 weight percent of another polymerized N-vinyl heterocyclic compound which compound is copolymerizable with N-vinyl-3-morpholinone.

5. Composition comprising a major proportion of at least about 80 weight percent, based on composition weight, of (a) a polymerized ethylenically unsaturated monomeric material containing at least about 80 weight percent of polymerized acrylonitrile and (b) a minor proportion of up to about 20 weight percent, based on the composition weight, of a graft copolymer of (a) between about 10 and about 80 weight percent of an alkenyl group-containing organic sulfonic acid compound selected from the group consisting of those having the formulae:

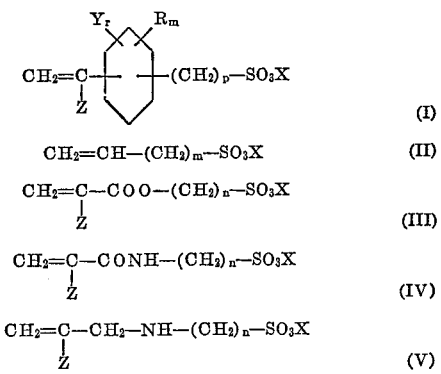

all wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to about 20 weight percent of a polymerized monoethylenically unsaturated monomeric material containing at least about 10 weight percent of polymerized N-vinyl-3-morpholinone and up to 90 weight percent of another polymerized N-vinyl heterocyclic compound which compound is copolymerizable with N-vinyl-3-morpholinone.

6. The composition of claim 5 containing between about 6 and about 12 weight percent, based on composition weight, of said graft copolymer.

7. The composition of claim 5, wherein said graft copolymer contains, in polymerized form, between about 30 and about 60 weight percent of said organic sulfonic acid compound as graft copolymerized substitutents on said N-vinyl-3-morpholinone polymer.

8. The composition of claim 5, wherein the graft copolymer is sodium styrene sulfonate on poly-N-vinyl-3-morpholinone.

9. The composition of claim 5, wherein the graft copolymer is sodium-2-sulfo ethyl methacrylate on poly-N-vinyl-3-morpholinone.

10. The composition of claim 5, wherein the graft copolymer is sodium vinyl benzyl sulfonate on poly-N-vinyl-3-morpholinone.

11. The composition of claim 5, wherein the graft copolymer is acryloyl taurine, sodium salt on poly-N-vinyl-3-morpholinone.

12. The composition of claim 5, wherein the graft copolymer is sulfo propyl acrylate, sodium salt on poly-N-vinyl-3-morpholinone.

13. The composition of claim 5, wherein the acrylonitrile polymer is polyacrylonitrile.

14. The composition of claim 5 dispersed in a solvent for polyacrylonitrile.

15. A filamentary shaped article comprised of the composition of claim 5.

16. Method for the preparation of a dye-receptive, antistatic, synthetic, linear, hydrophobic polymer composition which comprises mixing together a minor proportion of up to about 20 weight percent, based on composition weight, of (1) a graft copolymer of (a) between about 10 and about 80 weight percent of at least one alkenyl group-containing organic sulfonic acid compound selected from the group consisting of those having the formulae:

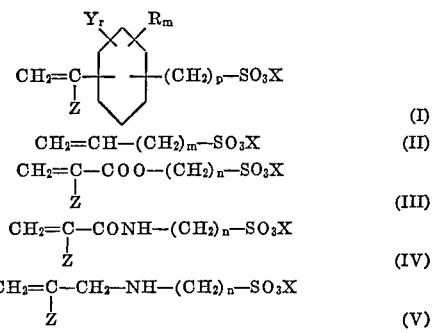

$$CH_2=CH-(CH_2)_m-SO_3X \quad (II)$$
$$CH_2=C-COO-(CH_2)_n-SO_3X$$
$$\phantom{CH_2=C-COO}|$$
$$\phantom{CH_2=C-COO}Z \quad (III)$$
$$CH_2=C-CONH-(CH_2)_n-SO_3X$$
$$\phantom{CH_2=C-CONH}|$$
$$\phantom{CH_2=C-CONH}Z \quad (IV)$$
$$CH_2=C-CH_2-NH-(CH_2)_n-SO_3X$$
$$\phantom{CH_2=C-CH_2-NH}|$$
$$\phantom{CH_2=C-CH_2-NH}Z \quad (V)$$

all wherein X is selected from the group consisting of hydrogen saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to about 20 weight percent of a polymerized monoethylenically unsaturated monomeric material containing at least about 10 weight percent of polymerized N-vinyl-3-morpholinone and up to 90 weight percent of another polymerized N-vinyl heterocyclic compound which compound is copolymerizable with N-vinyl-3-morpholinone, with (2) a polymerized ethylenically unsaturated monomeric material containing about 80 weight percent of polymerized acrylonitrile.

17. Method for the preparation of a dye-receptive, antistatic, synthetic, linear hydrophobic polymer composition which comprises immersing an aquagel of a polymerized ethylenically unsaturated monomeric material containing at least about 80 weight percent of polymerized acrylonitrile in the form of a shaped article into a dispersion of a graft copolymer of (a) between about 10 and about 80 weight percent of an alkenyl group-containing sulfonic acid compound selected from the group consisting of those having the formulae:

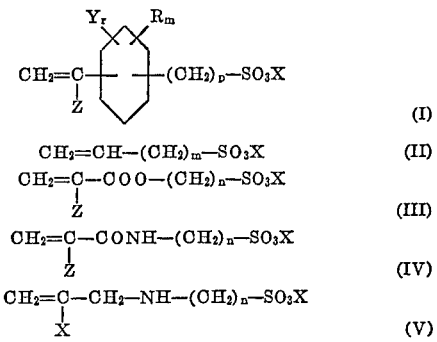

$$CH_2=CH-(CH_2)_m-SO_3X \quad (II)$$
$$CH_2=C-COO-(CH_2)_n-SO_3X$$
$$\phantom{CH_2=C-COO}|$$
$$\phantom{CH_2=C-COO}Z \quad (III)$$
$$CH_2=C-CONH-(CH_2)_n-SO_3X$$
$$\phantom{CH_2=C-CONH}|$$
$$\phantom{CH_2=C-CONH}Z \quad (IV)$$
$$CH_2=C-CH_2-NH-(CH_2)_n-SO_3X$$
$$\phantom{CH_2=C-CH_2-NH}|$$
$$\phantom{CH_2=C-CH_2-NH}X \quad (V)$$

all wherein X is selected from the group consisting of hydrogen saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to about 20 weight percent of a polymerized monoethylenically unsaturated monomeric material containing at least about 10 weight percent of polymerized N-vinyl-3-morpholinone and up to 90 weight percent of another polymerized N-vinyl heterocyclic compound which compound is copolymerizable with N-vinyl-3-morpholinone, until between about 2 and about 20 weight percent of said graft copolymer, based on resulting dry composition weight, is impregnated in said aquagel; and irreversibly drying said graft copolymer-containing aquagel to convert it from the aquagel condition to a finished shaped article form.

18. The method of claim 14, wherein said acrylonitrile polymer is polyacrylonitrile.

References Cited in the file of this patent

UNITED STATES PATENTS

| | | |
|---|---|---|
| 2,558,734 | Cresswell | July 3, 1951 |
| 2,861,101 | Tousignant et al. | Nov. 18, 1958 |